United States Patent
Shen et al.

(10) Patent No.: US 8,060,026 B2
(45) Date of Patent: Nov. 15, 2011

(54) SYSTEM AND METHOD FOR CALIBRATING A TRANSCEIVER

(75) Inventors: Ying Shen, Chapel Hill, NC (US); Guy Theberge, St. Joseph Du Lac (CA); Fabio Concilio, D-des-Ormeaux (CA); Shauen Thomas Trump, Cary, NC (US); Don E. Peck, Raleigh, NC (US)

(73) Assignee: Harris Stratex Networks, Inc., Morrisville, NC (US)

( * ) Notice: Subject to any disclaimer, the term of this patent is extended or adjusted under 35 U.S.C. 154(b) by 650 days.

(21) Appl. No.: 12/234,579

(22) Filed: Sep. 19, 2008

(65) Prior Publication Data
US 2009/0017774 A1 Jan. 15, 2009

Related U.S. Application Data

(62) Division of application No. 10/815,313, filed on Apr. 1, 2004, now Pat. No. 7,561,851.

(51) Int. Cl.
*H04B 1/38* (2006.01)
*H04B 17/00* (2006.01)

(52) U.S. Cl. .......... 455/73; 455/67.11; 455/423

(58) Field of Classification Search ........... 455/67.11, 455/67.14, 69, 73, 115.1, 115.2, 226.1, 226.2, 455/423, 424, 425, 522
See application file for complete search history.

(56) References Cited

U.S. PATENT DOCUMENTS

| | | | |
|---|---|---|---|
| 5,519,888 A * | 5/1996 | Hall et al. | ............. 455/226.1 |
| 5,839,059 A | 11/1998 | Hakkinen et al. | |
| 6,215,990 B1 | 4/2001 | Kidd | |
| 6,256,483 B1 | 7/2001 | Moerder et al. | |
| 6,278,485 B1 | 8/2001 | Franchville et al. | |
| 6,289,216 B1 | 9/2001 | Koh et al. | |
| 6,418,301 B1 | 7/2002 | Le et al. | |
| 6,473,603 B1 | 10/2002 | Toncich et al. | |
| 6,687,491 B2 | 2/2004 | Wieck | |
| 6,882,311 B2 | 4/2005 | Walker et al. | |
| 6,985,751 B2 | 1/2006 | Bartl et al. | |
| 7,006,447 B1 | 2/2006 | Vaisanen et al. | |
| 7,050,515 B2 | 5/2006 | Rahman | |
| 7,092,686 B2 | 8/2006 | Amanullah et al. | |
| 7,120,402 B2 | 10/2006 | Talwalkar et al. | |
| 7,130,589 B2 | 10/2006 | Lee et al. | |
| 7,418,244 B2 * | 8/2008 | Montalvo | ............. 455/127.2 |

OTHER PUBLICATIONS

PCT International Search Report and Written Opinion dated Jun. 21, 2005, for International Application No. PCT/US05/010299.
PCT International Search Report and Written Opinion dated Jun. 21, 2005, for International Application No. PCT/US05/010390.

* cited by examiner

*Primary Examiner* — Quochien B Vuong
(74) *Attorney, Agent, or Firm* — Sheppard, Mullin, Richter & Hampton, LLP

(57) ABSTRACT

The present invention provides systems and methods for calibrating a transceiver. In an exemplary embodiment, a method of operating a modular wide-range microwave transceiver, each having precalibrated modules, comprises the steps of coupling the precalibrated modules to form a radio unit, each module having a module memory storing predetermined calibration values, coupling the radio unit to a signal processing unit, determining a first attenuation value by adjusting a first transmit attenuator to achieve a predetermined target output of a AGC detector, and storing the first attenuation value in a first module memory, and when an RF loopback switch is coupled as part of the radio unit, determining a received signal level (RSL) correction factor and transmit output power correction factor based on a loop-back switch insertion loss.

22 Claims, 11 Drawing Sheets

SYSTEM AND METHOD FOR CALIBRATING A TRANSCEIVER

CROSS REFERENCE TO RELATED APPLICATION

This application is a divisional application of, and claims priority to, U.S. Nonprovisional patent application Ser. No. 10/815,313 entitled "System and Method for Calibrating Modules of a Wide-Range Transceiver," filed on Apr. 1, 2004, which is incorporated by reference herein.

TECHNICAL FIELD

Our invention generally relates to communications systems and, more specifically, the invention is related to the field of microwave wireless transceivers.

BACKGROUND OF THE INVENTION

Mankind has an insatiable desire to communicate. This demand has spurred on the development of a great variety of communications technologies—both wired, in the form of telecommunications and data networks, and wireless, such as cellular, microwave and satellite systems.

Making all these systems work together has become a daunting challenge. Back when there was only one dominant service provider—the Bell System in the U.S. and Canada—it was relatively straightforward to add a new technology to a fairly uniform network. In the case of wireless systems, the upgrades often involved a complete swap-out of the existing RF (radio frequency) units. But, the limited number of units, by today's measures, and fixed transceiver characteristics (e.g., a single modulation type), made migration far easier to plan for then than now.

Today, if a service provider wants to implement a wireless link using multiple modulation schemes at varying frequencies, it must typically resort to redundant componentry to cover the differing forms of communication. For example, the main receiver path for a microwave RF unit is traditionally equipped with band pass filters, whose bandwidth is equal or slightly larger than that of the signal to be processed. This capacity dependent filter determines the sample of the receiver path used to derive the AGC (automatic gain control) loop control voltage; the RSL (received signal level) strength indication is similarly derived. Since bandwidth tunable IF (intermediate frequency) filters are expensive and immature technology, the only practical way, until our invention, in which to implement a microwave RF unit that is wide-range (by which we mean multi-capacity, multi-bandwidth, and multi-frequency) would require a bank of IF bandpass filters. However, such filter banks, for use across many different bandwidths, are not cost effective. They also occupy significant space in the RF unit, which defeats a key objective of keeping the RF unit small and compact.

A different kind of problem exists when with trying to implement the transmitter path in a wide-range microwave transceiver. In order to achieve a wide dynamic range—e.g., 40 dB accurate power control—at microwave frequencies, most current designs rely on open-loop calibration methods. These typically require the RF unit to be calibrated as a whole unit, leading to complexity in the overall test setup, increased costs, and increased test times.

In both cases, current designs fail to adequately address the problem created by the needs of service providers to more frequently change their network configurations. Whether driven by advances in technology, or changing customer requirements, a more flexible RF unit design is needed to avoid a complete unit swap-out as new capacity/bandwidth/frequency technologies are implemented for a given link.

Thus, there is a need for a better microwave RF unit design, one which allows for flexibility and ease in implementing multiple performance criteria (e.g., capacity, bandwidth, and/or frequency) in a low-cost manner, while still meeting all desirable and mandated regulatory specifications for the selected types of communications.

SUMMARY OF THE INVENTION

The present invention provides a method, system, and processor instructions for calibrating a modular wide-range microwave communication system. In an exemplary embodiment, the system includes a first radio module including a calibration memory and radio circuitry (e.g., RF transmit, RF receive, and IF circuitry), a test signal processing system including a signal generator, measuring unit, memory, and a processor with instructions; and (for over-temperature tests) an oven or other controlled environment. The system is operable for controlling the signal generator to supply a series of test signals to the first radio module, for controlling the radio circuitry to set attenuation values, for controlling the measuring unit to determine characteristics (e.g., output power) of the radio circuitry based on the series of test signals, and for determining calibration values based on the series of test signals, attenuation values, and the determined characteristics of the radio circuitry, whereby the calibration values are stored in the calibration memory of the radio module. A modular wide-range transceiver using pre-calibrated modular units, and its operation, is also disclosed.

The present invention also provides systems and methods for calibrating a transceiver. In an exemplary embodiment, a method of operating a modular wide-range microwave transceiver, each having precalibrated modules, comprises the steps of coupling the precalibrated modules to form a radio unit, each module having a module memory storing predetermined calibration values, coupling the radio unit to a signal processing unit, determining a first attenuation value by adjusting a first transmit attenuator to achieve a predetermined target output of a AGC detector, and storing the first attenuation value in a first module memory, and when an RF loopback switch is coupled as part of the radio unit, determining a received signal level (RSL) correction factor and transmit output power correction factor based on a loop-back switch insertion loss.

The method may further comprise applying the transmit output power correction factor to correct output power at an antenna port and/or coupling the radio unit to a diplexer. Determining the first attenuation value may comprise incrementing or decrementing the first attenuation value. The transmit output power correction factor and/or the RSL correction factor may also be based on a diplexer insertion loss.

An exemplary transceiver comprises a signal processing unit and a radio frequency (RF) unit. The RF unit may be operative coupled to the signal processing unit. Further, the RF unit may include a plurality of precalibrated modules. Each precalibrated module of the plurality of precalibrated modules may have a module memory. The plurality of precalibrated modules may comprise a first, second, and third precalibrated module. The first precalibrated module may be configured to determine a modified attenuation value by adjusting a predetermined attenuation value until a target output of an AGC detector is within a predetermined target range and to store the modified attenuation value within the module memory. The second precalibrated module may be configured to determine a loop-back switch insertion loss. The third precalibrated module made be configured to determine a received signal level (RSL) correction factor and an transmit output power correction factor based on the loop-back switch insertion loss.

Another exemplary method of calibrating a transceiver comprises determining if a voltage of an AGC detector is within a predetermined range, modifying an attenuation factor until the voltage of the AGC detector is within the predetermined range, storing the attenuation factor within a transceiver memory, determining a transmit output power correction factor based, at least in part, on a loop-back switch insertion loss, and applying the transmit output power correction factor to correct output power at an antenna port.

BRIEF DESCRIPTION OF THE DRAWINGS

The novel features believed characteristic of the invention are set forth in the appended claims. However, the invention itself, together with certain objectives and advantages, may best be understood by reference to the following detailed description of an illustrative, presently preferred embodiment thereof, when read in conjunction with the accompanying drawings, of which:

DESCRIPTION OF THE PREFERRED EMBODIMENT

The limitations of prior systems described above are overcome by the novel improvements of our invention, which are illustrated by the following detailed description of a preferred embodiment. In this embodiment, common transmit path and receive path designs are implemented in modular form. Despite the common designs, by using a modulation index and combining modulation/capacity correction factors, a variety of modulations (e.g., QPSK, 256QAM), capacities (e.g., 2T1, STM1), and bandwidths may be transceived without resort to redundant or expensive circuitry. This improvement also allows for a per-module room-temperature calibration process, performed during standard module production, which substantially reduces per unit production costs and factory capital costs for testing. Moreover, by appropriate location of attenuators, detectors, and filters, together with software control and correction mechanisms, the embodiment disclosed can achieve sustained performance across a very wide range of frequencies (over 40 dB of accurate power control from 3 to 40 GHz and higher).

Figure 1:
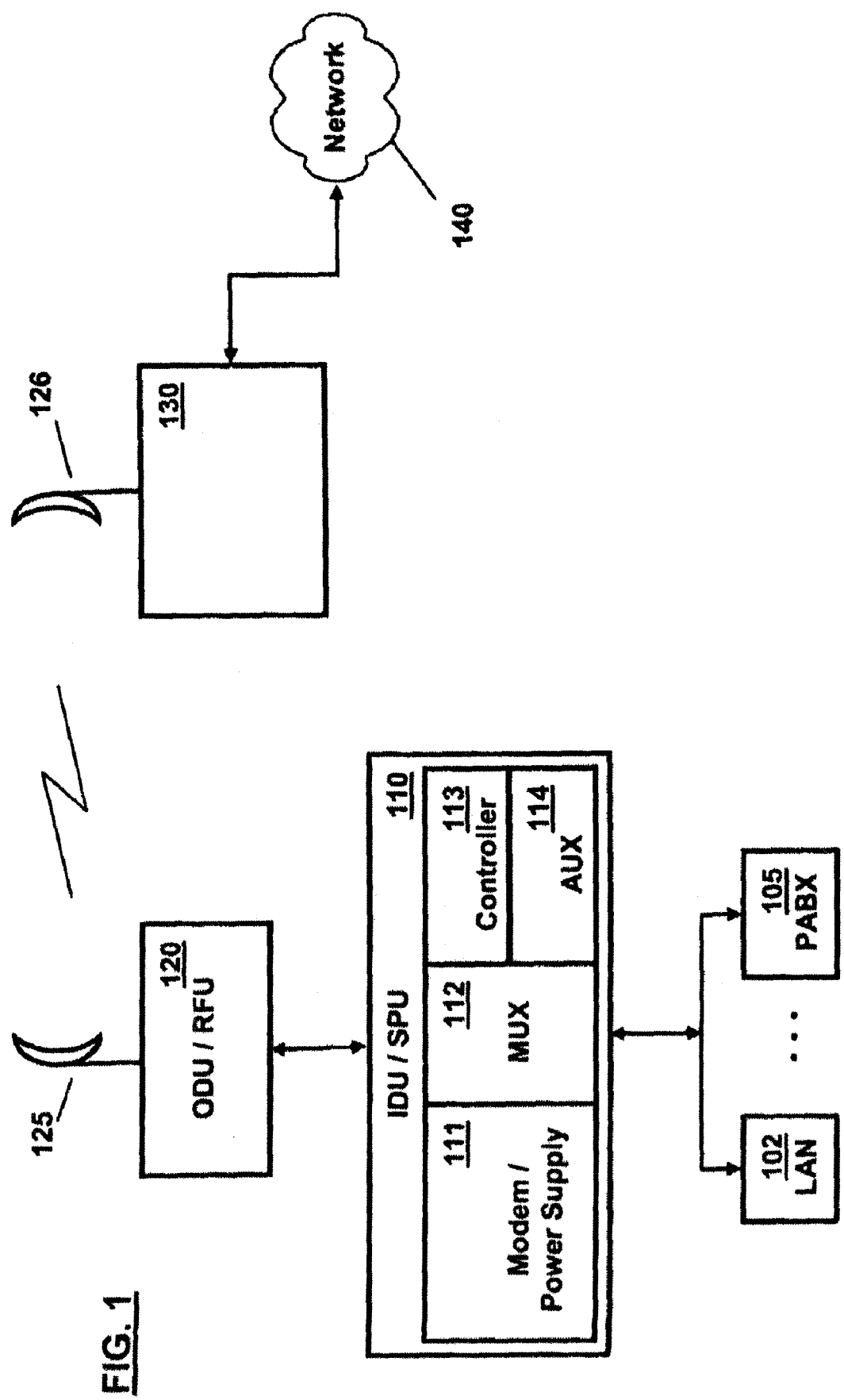
FIG. 1 is a block diagram of an illustrative communications system of which the invention forms a part.

With reference now to the figures and in particular with reference to FIG. 1, a pictorial representation of a communications system in which the present invention may be implemented is depicted in accordance with certain presently preferred embodiments of the invention. This particular embodiment is typical of many microwave relay designs, where certain components and functionality are housed in an outdoor unit (or ODU 120), while others are stored remotely in more protected environments (see IDU, or indoor unit, 110). Those skilled in the art will appreciate that the invention can be readily implemented in connection with a variety of other configurations, depending on the particular wireless system being implemented. In particular, while the following embodiment describes the invention in the context of a microwave transmission system, it may also be advantageously implemented in most any microwave/millimeter wave frequency wireless system, including more integrated indoor-only systems, and systems where the signal processing and radio processing are in one unit.

The indoor unit 110 is, in the illustrated case of FIG. 1, a signal processing unit (SPU), which includes the signal processing equipment needed for the microwave communications. This allows designers to minimize the equipment that has to be stored in the outdoor unit 120, closer to the antenna 125. In this case, the SPU 10 includes a MUX or multiplexer unit 112 connected to wireline networks such as LAN 102 and PABX 105. It also includes other necessary and/or optional components, depending on the type of communications desired, such as modem/power supply 111, auxiliary units 114, and controller 113.

The SPU/indoor unit 110 is connected to the RF/outdoor unit 120 by appropriate means such as an RG8 coaxial cable. The RFU 110 contains the IF and RF components (described in more detail below) for converting the signaling from the SPU into an appropriate wireless signal for transmission via antenna 125. Antenna 125 receives/transmits wireless signaling with other remote antennas such as antenna 126, which is connected to further networks 140 via its local RF/signal processing equipment 130.

1. Overview of the RF Unit

Figure 2:
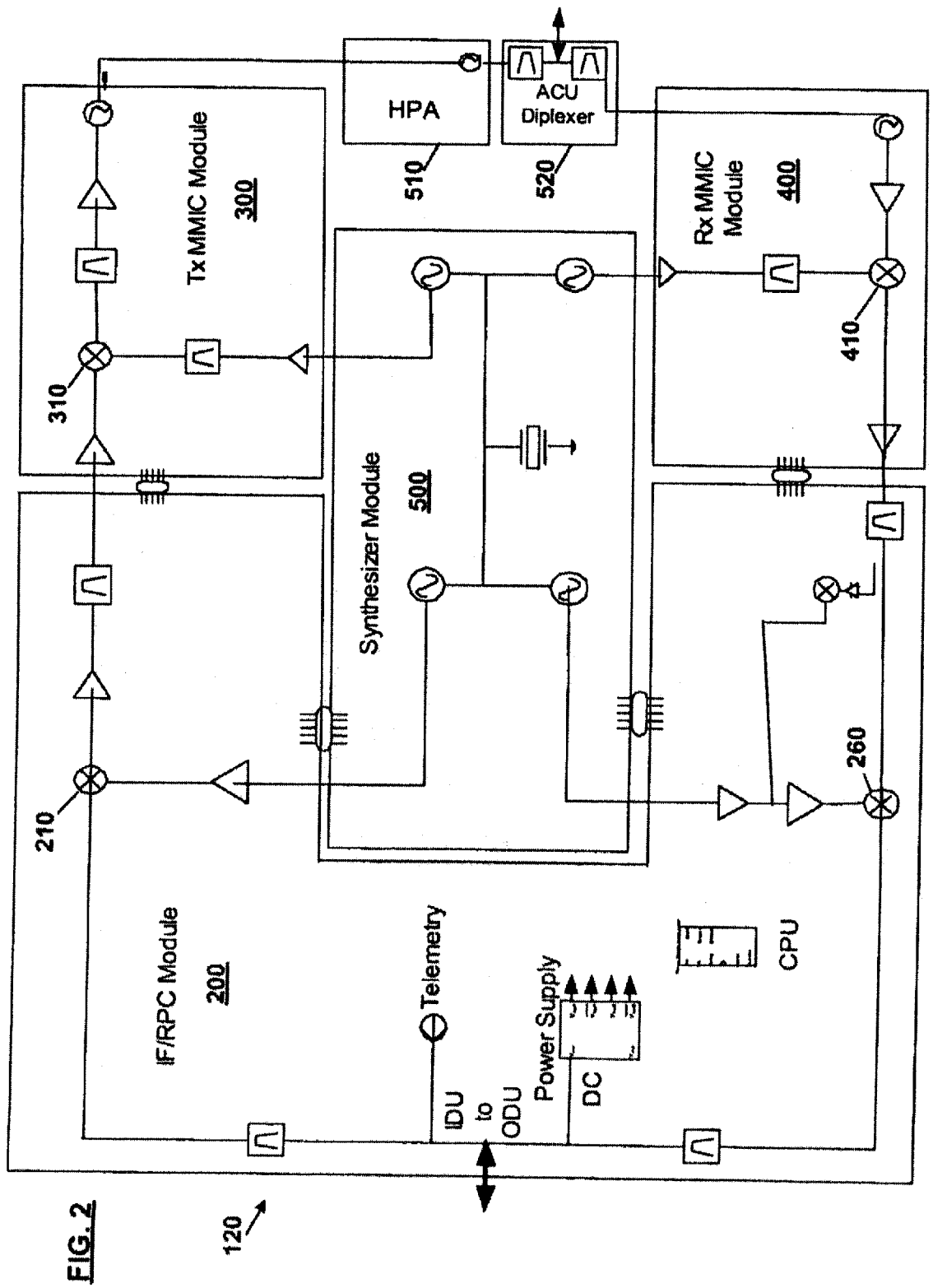
FIG. 2 is a block diagram of an illustrative embodiment of an RF unit in accordance with the invention.

FIG. 2 illustrates one embodiment of a modular RFU 120 in accordance with the invention. Only part of the circuitry is illustrated here, and more detailed descriptions of the individual modules are provided below in connection with FIGS. 3 through 6. Here, the RFU 120 has been conveniently produced in six modules, each capable of separate manufacture and rapid placement or replacement from a given RFU. These six modules are: IF/RPC (radio processing card) 200 (also shown in FIGS. 4A and 4B); transmitter monolithic microwave IC (Tx MMIC) module 300 (also shown in FIG. 5); receiver monolithic microwave IC (Rx MMIC) module 400 (also shown in FIG. 6); synthesizer module 500; high power amplifier (HPA) module 510; and antenna coupling unit (ACU) diplexer module 520. As noted above, this is an illustrative embodiment, and those skilled in the art should appreciate that a variety of alternative configurations are possible, including those either more highly integrated, or those using discrete components (i.e., not just IC's); and a "module" can represent everything from a single chip to a multi-card subsystem or series of boxes functioning together; those having direct (cable-less) connections; and those in which the SPU and RPU (and other processing/networking) functions are fielded in one unit.

When transmitting, the signaling information is received via the cable from the IDU 110. This signaling information includes both the data signal being transmitted via antenna 125, as well as certain control and telemetry information as needed. The control information may include, e.g., instructions to a processor (CPU 208) used to control module settings based on the particular frequency and modulation format desired for a given data signal. The telemetry information also includes certain power and alarm status information. The data signal is appropriately filtered and amplified along the transmit path of RPC module 200 and Tx MMIC module 300. Synthesizer module provides an appropriate local oscillator (LO) signal to mixers 225 and 310 along the transmit path. After being appropriately upconverted, the data signal is applied to antenna 125 via ACU diplexer 520 and transmitted.

On receiving a data signal, it is appropriately filtered and amplified along the receive path of Rx MMIC module 400 and RPC module 200. Synthesizer module 500 provides an appropriate local oscillator (LO) signal to mixers 235 and 410 along the receive path. After being downconverted, the data signal is forwarded via the cable to IDU/SPU 110 for further processing.

While the embodiment of FIG. 2 has been shown as a double conversion transceiver, those skilled in the art will readily appreciate that other designs are similarly useful in implementing the invention. The implementation chosen will be a matter of design choice.

Figure 3:
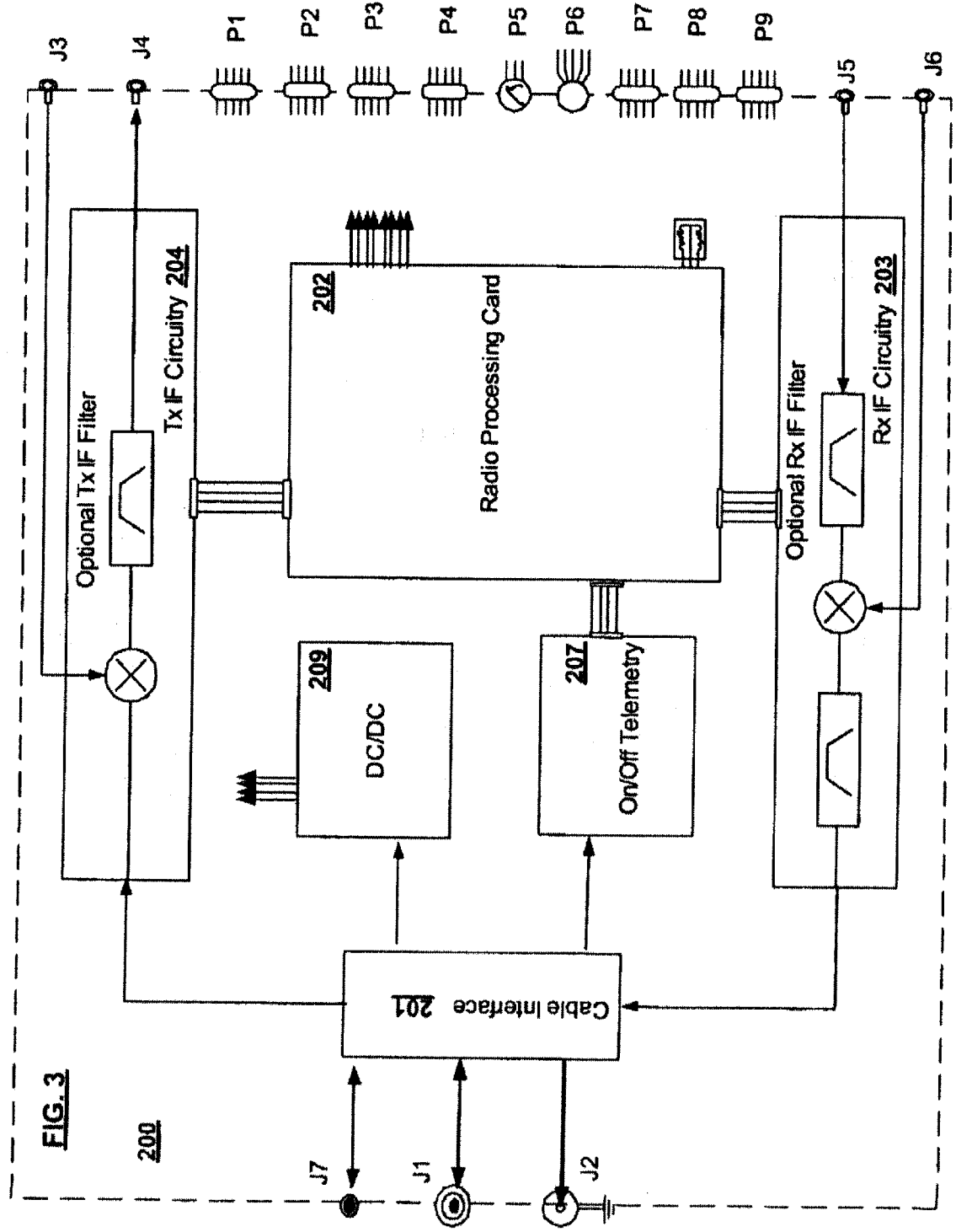
FIG. 3 illustrates a first IF (intermediate frequency) module according to an embodiment of the invention.

FIG. 3 illustrates a card-level view of one possible configuration of the components in the IF/RPC module 200. In order to implement a modular approach, quick connect cables and pins are used at the interfaces between the IF/RPC 200 components with the other modules and external cables. Beginning with the connection to the cable from the IDU/SPU 110, a connector such as an N-type adapter J1 may be used to join the cable to a cable interface 201 or inside module 200. Other connectors to the cable interface may be used for other signaling, such as normal/fail LED power via J7 and AGC (automatic gain control) information via J2. The data signal from the SPU is provided, at a first frequency (e.g., 310 MHz) to the Tx IF Circuitry 204. The Tx IF Circuitry receives an LO signal via SMA connector J3 and, with appropriate processing applied via radio processing card 202, outputs an IF signal via connector J4 to the Tx MMIC Module 300. The cable interface 201 is also coupled with the DC power supply 209, which provides the various designed voltages for module componentry, and the on/off telemetry circuit 207, which further controls RPC 202.

On the receive circuit, an Rx IF Circuitry 203 is provided with appropriate connections to the Rx MMIC Module 400, via J5, and a receive IF LO signal via J6. The Rx IF Circuitry 203 is similarly coupled to the RPC 202, and its output is in turn coupled to cable interface 201.

Various other module connections are provided via pins, such as P1 through P9. In one illustrious embodiment, the type of functionality enabled might include: P1—connection to the Tx upconverter; P2—connection to the Rx downconverter; P3—control connection to synthesizer module 500; P4—control connection to HPA 510; P5—connection with the module's optical ID (242 in FIG. 4B); P6—connection with the module's EEPROM 250; P7—connection to the MHSB (monitored hot-standby) switch; P8 and P9—RF loop back switches (Tx and Rx). Of course, a wide variety of connections and connector types are possible, depending on the design choices involved for the particular functionality desired.

2. Transmit Path

Figure 4A:
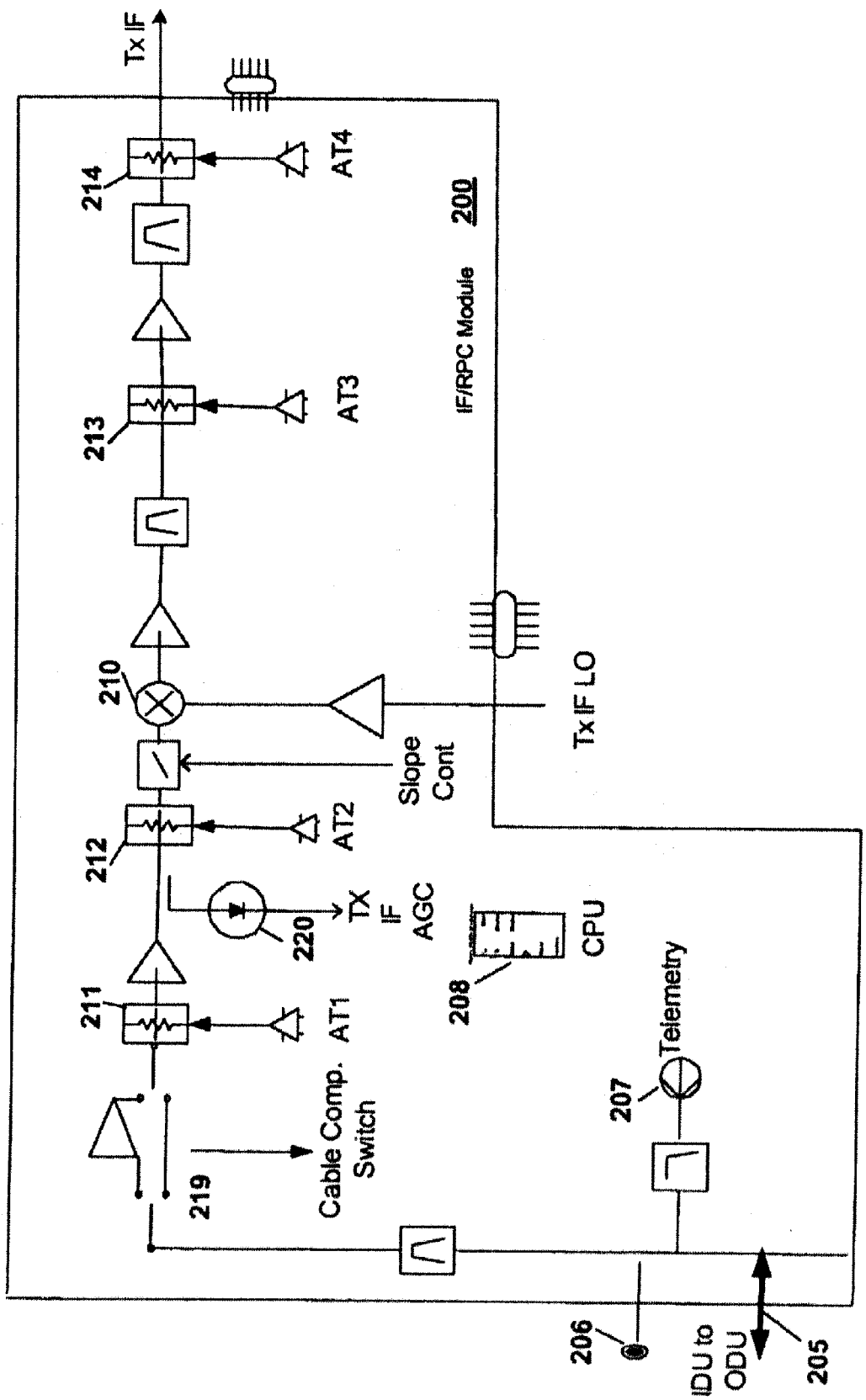
FIGS. 4A and 4B, respectively, illustrate transmit and receive paths of the IF module of FIG. 3.

Turning now to FIG. 4A, a more detailed description of the a transmit path of the IF/RPC Module 200 is illustrated. As discussed above, a cable 205 connects to RPC module 200 and provides both data and control signaling to the RFU 120. The control signaling is provided to telemetry unit 207, and further applied to the routines processing in CPU 208. These routines, which are executed when implementing these embodiments, whether implemented as part of an operating system or a specific application, component, program, object, module or sequence of instructions, will be referred to as CPU programs, or simply programs. The programs typically comprise one or more instructions that are resident at various times in various memory and storage devices used in connection with CPU 208, and that, when read and executed by one or more processors, cause the system to perform the steps necessary to execute steps or elements embodying the various aspects of the invention. CPU 208 can be any processor type, depending, of course, on the design requirements of the intended applications supported by the RFU 120.

The IF transmit path includes multiple attenuators used in accurately setting the transmission characteristics, in order to deliver the desired output RF signal. Two of these attenuators, AT1 (211) and AT4 (214), are digital attenuators. Presently preferred attenuators would include high P.sub.1 DB PIN diodes in view of the high linearity these yield, without the expense and performance issues associated with alternatives like variable gain attenuators, FET diodes and the like. The remaining attenuation is preferably applied via analog means. Thus, in a two-attenuator implementation, two DACs (digital to analog converters), AT2 (212) and AT3 (213), are used to apply the bias to the PIN diodes, controlling the resistance value to change the RF signal level.

In operation, the four attenuators function as follows. The first digital attenuator AT1 (211) functions in a closed-loop operation with the AGC (automatic gain control) circuitry 220. Unlike the other attenuators, AT1 need not be adjusted during operation, but is set once during an initialization (e.g., power-on) operation. Its purpose is to compensate for input power variations that result from the (unknown) cable length between the SPU 110 and RFU 120. The second digital attenuator, AT4 (214), is used for modulation index backoff. It is programmable according to the different modulation settings, and is used to maintain linear operation of the transmitter path throughout all the modulations selectable. Attenuators AT2 and AT3 (212, 213) function in a closed loop manner together with attenuator AT5 (315), IF detector 307, and RF detector 320, all of the Tx MMIC module discussed below in connection with FIG. 5. These attenuators 212, 213, 315 combine with detectors 307, 320 to provide closed-loop control at all powers, and function to compensate for any frequency, modulation, capacity, temperature, or unit-to-unit variations.

Figure 5:
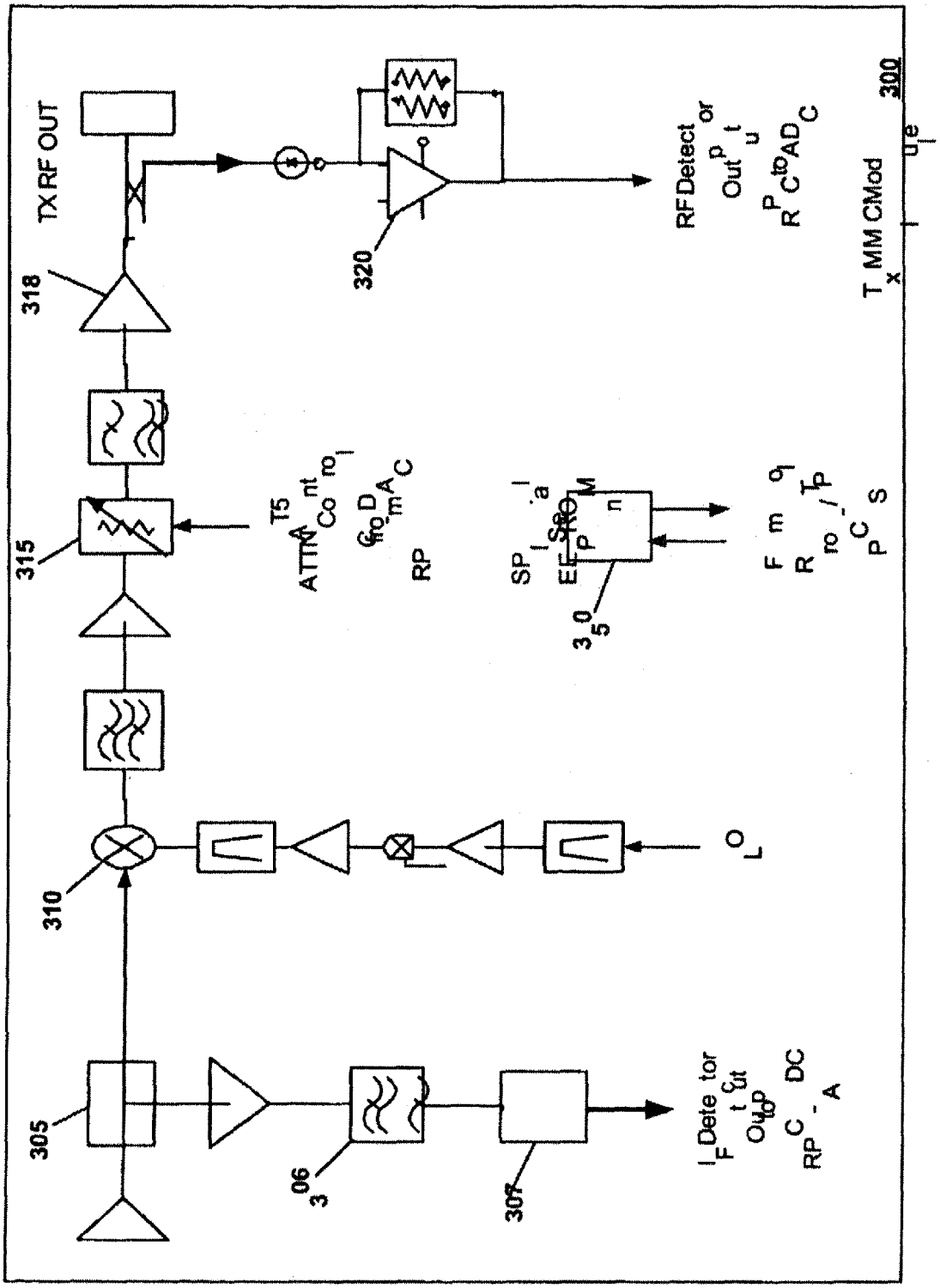
FIG. 5 illustrates an RF transmit module according to an embodiment of the invention.

Continuing next with FIG. 5, the Tx MMIC module 300 detects the IF input to module 300 using a power detector 307. In the illustrated case, the IF input from power splitter 305 is applied to a multi-section bandpass filter (BPF 306), which rejects any LO leakage via mixer 310 and IF spurs that otherwise might impact power detector 307. This allows for a wide range of operation, e.g., from +5 dBm to −32 dBm. After upconversion via mixer 310, the transmit signal is further attenuated at AT5 312. Finally, detector 320 functions to provide high and low gain RF output detection. Low gain detection would be appropriate, for example, with QPSK modulation (e.g., at a 10 dB range), while high gain would be appropriate for high capacity modulations like 128 QAM (e.g., at a 5 dB range). The output of both detectors 306, 320 is provided to the RPC 202 ADC, while the AT5 325 input control is from the RPC 202 DAC, in appropriate size/format (e.g., 8 bit signals in this illustration).

3. Operation of a Transmit Path

In operation, since this embodiment uses dual up-conversion, the IF signal from the SPU 110 (e.g., 310 MHz) is first up-converted to the second IF frequency at mixer 210 (e.g., in a 2-3 GHz range). The data signal is up-converted again to the desired RF output frequency at mixer 310 (e.g., somewhere in the range of 6-40 GHz). The control signaling received at telemetry unit 207/CPU 208 is used to programmatically adjust the transmit path settings for the desired frequency and modulation of the output RF signal.

On initialization/power on, the closed leveling loop of AT1 211 and AGC 220 is used to account for variation in the Tx IF signal level due to differences in the IF cabling length. The AGC 211 preferably adjusts AT1 211 attenuator and switch amplifier gain to drive the associated voltage detector to a target reference (e.g., 2V). High and low alarm threshold may also be used to trigger an alarm if the Tx IF detector voltage level falls outside these thresholds. A manual mode may also be provided for control of the attenuator, e.g., for test and debug purposes.

The transmit power control process is accomplished using stored values (e.g., calibration table values stored in EEPROMs 250, 350) applied via a transmit power control program. In a preferred process, this program is an interpolation process, using present values of frequency, dynamic range and temperature together with the stored calibration values of the IF/RPC and Tx MMIC modules 200 and 300 to run the power control algorithm. Because of strict regulatory requirements the output power settings are tightly controlled, preferably meeting a maximum of 0.5 dB/10 ms and temperature sensor update every 2 seconds or so.

The Tx MMIC and IF module memories 250, 350 preferably store calibration tables that contain the entire transmit power attenuation values supporting the full dynamic range (e.g., 40 dB for QPSK, for which 8 dB is achieved in the RF path and 32 dB in the IF path, in incremental (1 dB) steps). The calibration tables contain the attenuator control voltage (a DAC value) necessary to achieve the corresponding power output level, at the corresponding frequency of the table. The Tx MMIC module 300 calibration table also contains the IF and PA detector 306, 320 voltage values (an ADC value), taken during the calibration process and stored in EEPROM 350. The output power stability is maintained by an output power limiting window, a value dynamically calculated from RF/IF detector curves and kept at a fixed range (e.g., +/−0.5 dB) for the whole RF/1F detector range. The window is thus an output power and unit dependent number.

The transmit power control process is preferably implemented between two temperature plateaus, bounding the current RFU 200 internal temperature. The resulting attenuator control voltages are then interpolated based on the interpolation of the current RFU 200 temperature against the bounded (stored/calibrated) temperature plateaus. The computed control voltage is compensated over dynamic range, modulation, capacity, frequency, and temperature, and is used to drive the Tx PA (power amplifier 318, represented as a single stage but which could be multistage) to a target output power. This interpolation process is preferably performed at frequent intervals (e.g., every 2 seconds), or whenever there has been a change in frequency or required Tx PA 318 level to change.

For example, given a particular modulation (such as 128QAM) and detected temperature (via sensor 244), the appropriate control value stored in EEPROM 250 is used to set AT4 214 to the appropriate modulation index backoff value. This value was previously determined during the calibration process (e.g., 2 dB for QPSK, while lower at 10 dB for 256QAM). Attenuators 212, 213, and 315 then operate together in a closed looped fashion with the IF and RF detectors 306, 320 to provide the desired dynamic range. In order to minimize emitted noise, the attenuators are preferably set starting with AT5 315 incrementally up to its maximum value (e.g., from 0 to 18 dB), then adding AT3 213 incrementally up to its maximum value (e.g., from 0 to 15 dB), then adding AT2 212 as needed up to its maximum value (e.g., from 0 to 30 dB), to achieve the desired total range (e.g., 40 dB). The reverse process is used when removing attenuation, i.e., first zeroing out AT2 212, then AT3 213, and finally adjusting AT5 315 incrementally down. The initial/minimum AT5 315 setting is preferably a fixed value over the desired RF stage attenuation (e.g., 4+8 dB) in order to avoid overdriving the RF PA 318.

Figure 7A:
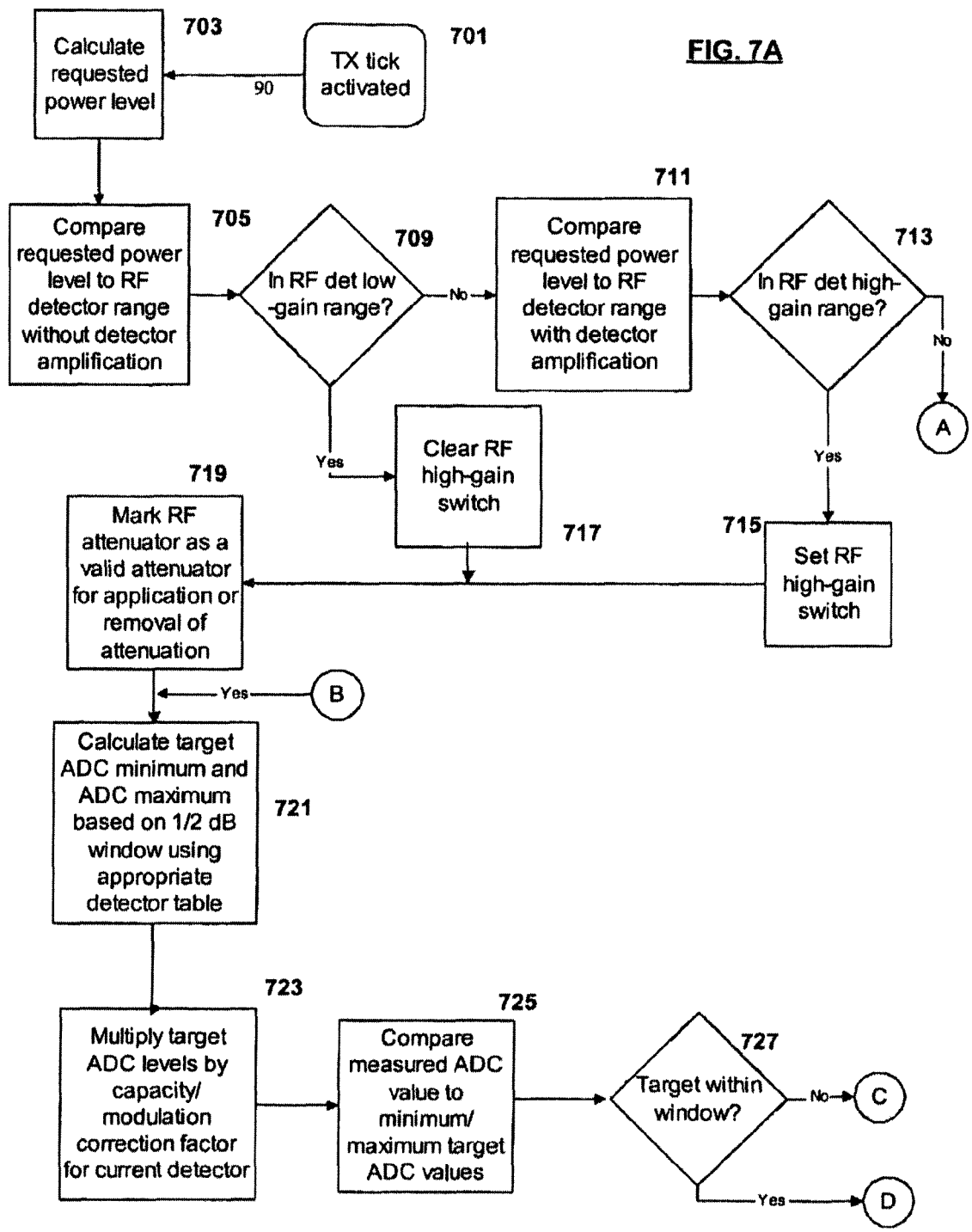
FIGS. 7A and 7B illustrate a flow chart of an algorithm for controlling transmit path settings according to an embodiment of the invention.
Figure 7B:
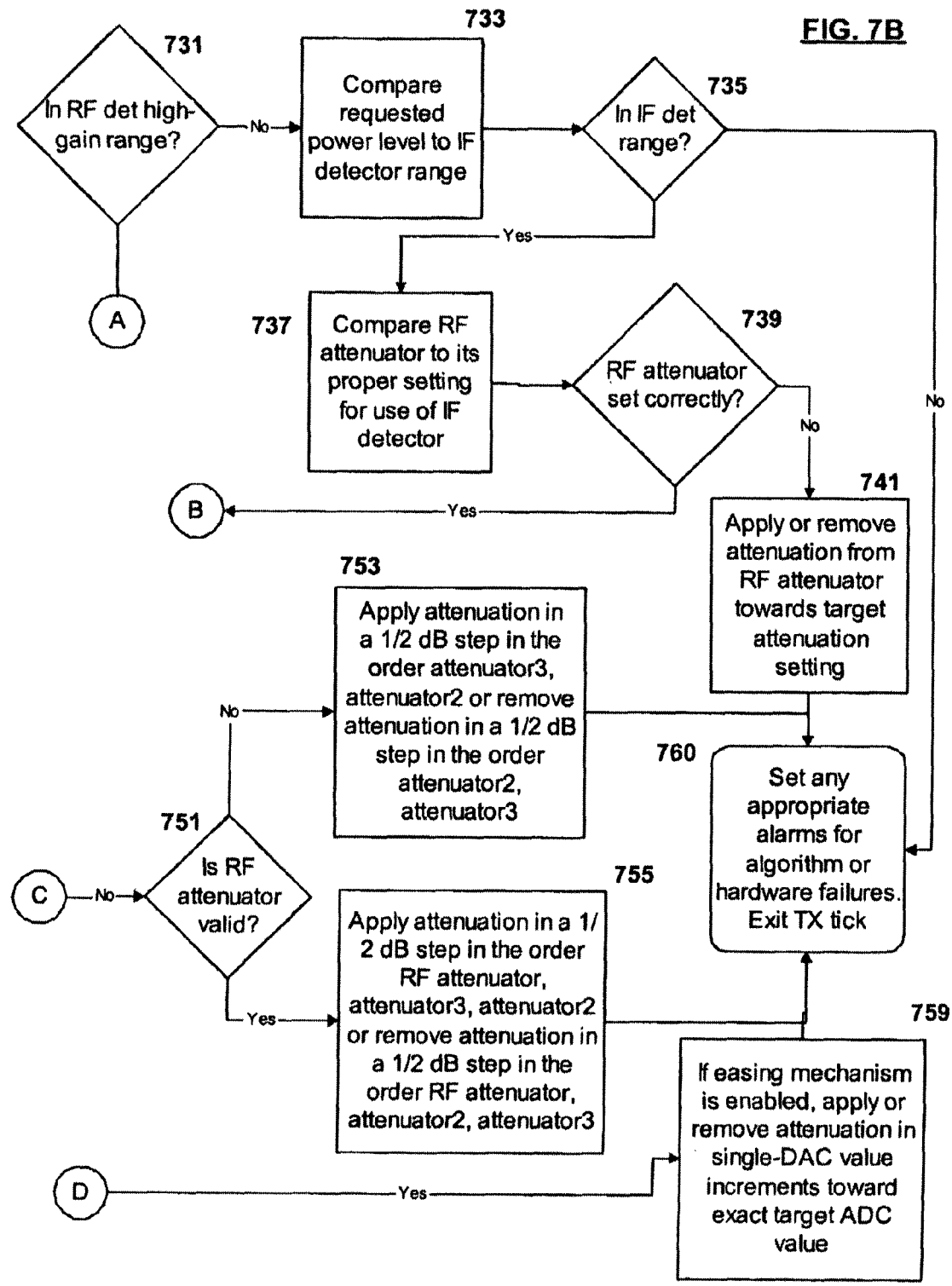

The transmit control algorithm is further illustrated by the exemplary flow chart of FIGS. 7A-7B. On first activating a transmit tick (i.e., a process timing clock beat), the requested power level is calculated and compared against the range of RF detector 320 without amplification (steps 701-705). The high-gain switch of the RF detector circuit is set high or low, respectively, if the power level is in the high or low range, respectively (steps 709-717). The target ADC min and max values are then calculated using the appropriate detector table (for AGC detector or RF detector as the case may be), and multiplied by capacity/modulation correction factors stored during calibration. The measured ADC value at the detector is then compared to the target min/max values (steps 721-727). If the target value is in the window, an easing or other slow convergence mechanism may be applied in single value increments toward the exact target value (step 759). Otherwise, attenuation is incrementally applied or removed from AT5, AT3 and AT2 towards the target attenuation setting (steps 733-755).

The transmit operation can similarly support a manual mode, for remote, test or debug purposes. Other options, such as mute (e.g., useful for up to 100 msec. after a frequency change to allow synthesizer 500 to settle out), may be automatically implemented via the control algorithm.

By using precalibrated modules 200, 300, with local memories 250, 350, temperature sensor 244, and processor 208 algorithm, this embodiment now realizes a fully software programmable, common path, modulation and capacity independent wide-range transmitter. Thus, in the illustrated embodiment one is capable of satisfying stringent power control requirements (e.g., +/−1 dB) over a wide dynamic range (e.g., 40 dB in 1 dB steps), over a wide frequency range (i.e. 37-40 GHz) within a given band, varying modulation (e.g., QPSK up to 256QAM) and capacity (e.g., 1.5 Mb/s (T1) up to 180 Mb/s (4DS3)), and over a wide operating temperature range (e.g., −33 C to +55 C), all in a single, modular outdoor transceiver.

Moreover, by the use of IF and RF detectors, attenuators, and EEPROMs as described above, this improved transmitter design supports module-level calibration. This is very advantageous, as it allows a manufacturer to avoid the expense of traditional over-temperature, over-frequency, over-dynamic range, and whole-RF unit calibration methods. This results in greatly reduced calibration times, test/production/manufacturing cost, and test/production-required capital investment.

4. Receive Path and Operation

Figure 4B:
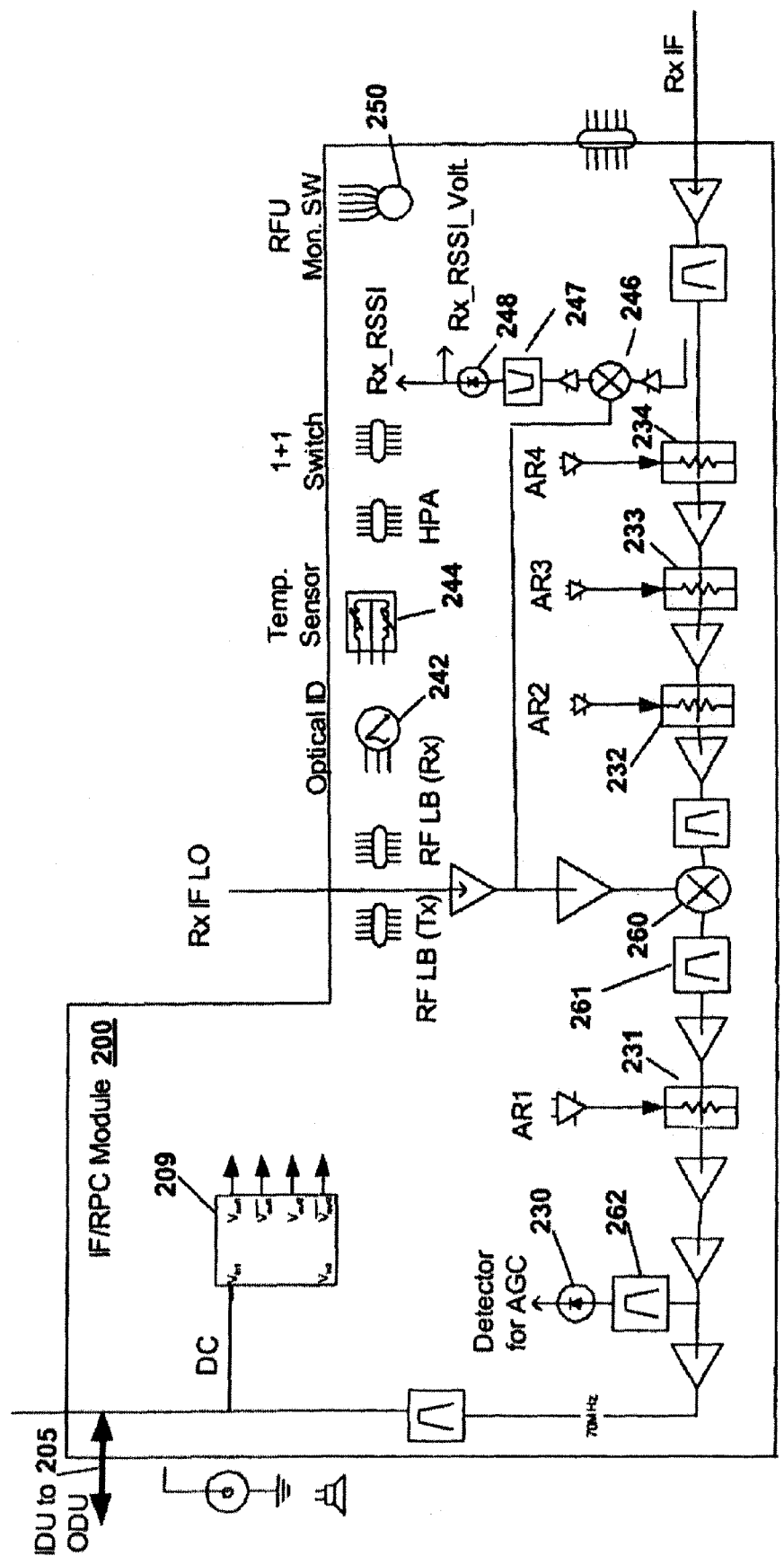
Figure 6:
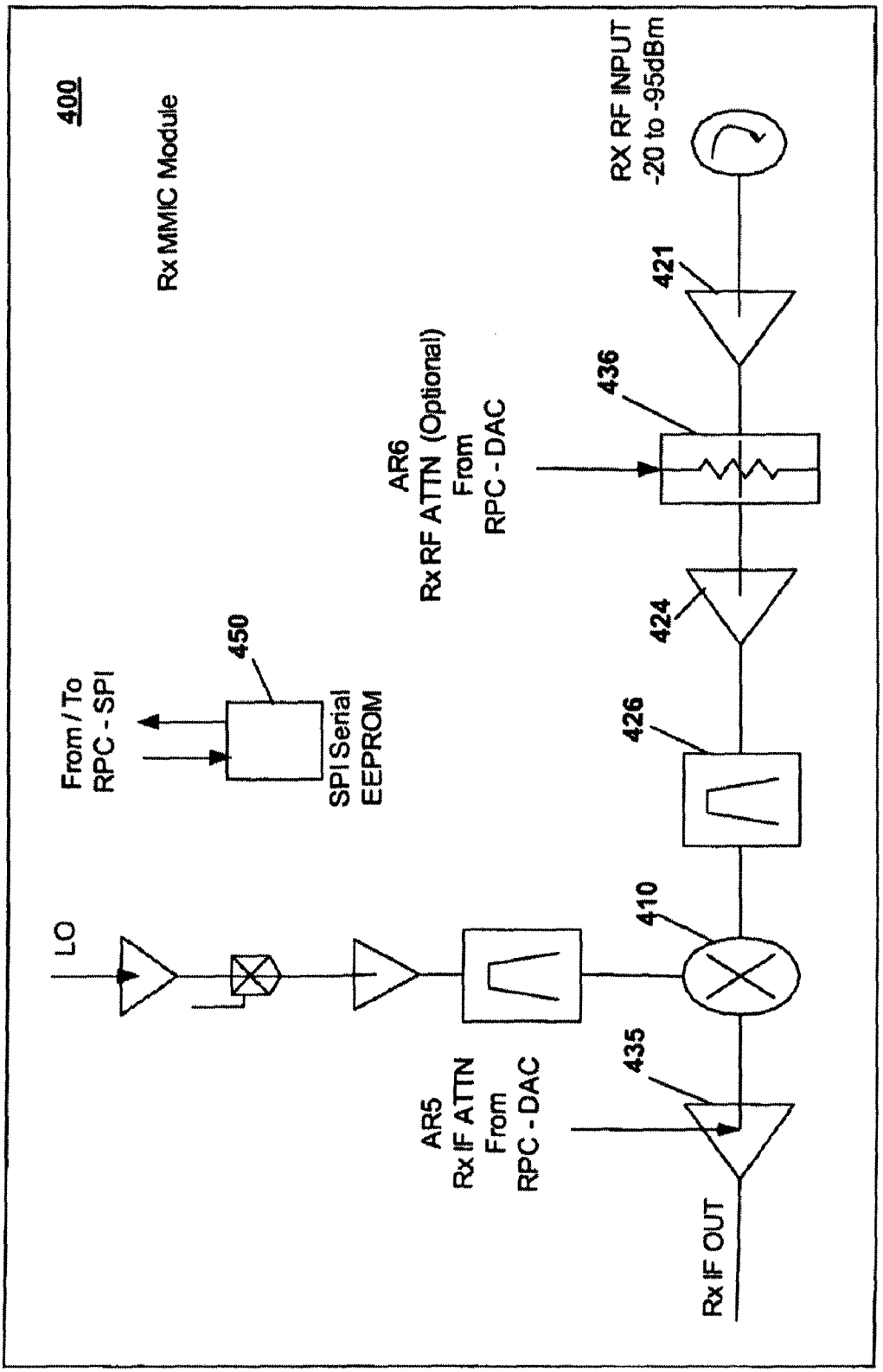
FIG. 6 illustrates an RF receive module according to an embodiment of the invention.

The receive path of RFU 120 is illustrated in FIGS. 4B and 6. In a preferred implementation, both transmit and receive IF paths and the RPC componentry are advantageously located in the same module, although they could also be implemented in plural modules.

A key problem with implementing a common path, modular, wide-range microwave receiver is the in-band interference found within a wideband IF signal. This arises, for example, because the regulatory requirements are such that systems need to meet interference requirements only within a fixed number of channels away (e.g., −30 dB C/I (carrier to interference) within 2 channels). An RFU designed to handle only a 40 MHz channel would have filters designed to handle the adjacent channel interferers. However, if the same receive path has to handle a 3.5 MHz channel, the interferers will fall in-band due to the greater filter bandwidth. This problem could be solved by resorting to either a variable bandwidth filter or a filter bank, but neither one of these provide a satisfactory solution due to the corresponding increase in size and expense from using them.

The receive path disclosed in FIGS. 4B and 6, however, enables just such a wide-range common path without resort to filter banks or variable bandwidth solutions. It accomplishes this by the exemplary placement of filters, attenuators, and AGC and RSL (received signal level) detectors, discussed below.

Turning to FIG. 6, a received signal is first applied to the Rx RF input of Rx MMIC module 400. Because of the variety of transmission path interferers and other phenomena (e.g., fading), the transceiver 120 is typically designed to retrieve signals within a wide dynamic (e.g., −20 dBm to 95 dBm at the Rx RF input). But, the downconverted second IF signal must be kept constant throughout the subsequent IF stage and SPU 110 processing, and this is accomplished primarily by the closed loop formed by the AGC and attenuators AR1-AR4 231-234 in the IF/RPC 200 module. In the Rx MMIC module 400, the received signal is first filtered and amplified, and downconverted via mixer 410. RF filter 426 has to be wideband, typically substantially wider than the widest of the desired signal bandwidths. This wide band RF filter has smaller insertion loss than its narrow band RF filter counter part. Smaller insertion loss provides higher system gain.

An optional attenuator AR6 436 may be used if the additional attenuation is needed, and it functions together with attenuators AR1-AR4 231-234 and AGC 230 to provide the necessary closed loop control. This may happen, for example with 256QAM modulated signals; in this case, AR6 is actuated when the other attenuators have reached to high levels to provide the necessary extra attenuation and linearity. AR5 435 provides a temperature/frequency compensation, which is independent of the input signal level. Altogether, the Rx Module provides a designed gain (e.g., 8 dB+/−3 dB). As with the other modules, the necessary calibration factors for this module 400 are stored in local memory 450, which could be any of a variety of convenient memories, including but not limited to an EEPROM.

The first IF signal is then passed from Rx MMIC module 400 to IF/RPC module 200. This portion of the receive path uses one wideband IF filter bandwidth in the main path, which bandwidth is selected to be equal or slightly wider than that of the desired signal bandwidth for all the capacities (e.g., 40 MHz). However, the AGC control voltage is derived from the sample of the second IF frequency using a narrow bandpass filter 262. Likewise, the RSL level detector circuit uses a narrow bandpass filter 248. The narrowband RSL filter is selected at an appropriate bandwidth (e.g., at 3.5 MHz) to provide rejection of interferers beyond the required separation (e.g., 2 channel C/I at 30 dB) for the narrower bandwidth signals. By using a wideband filter 261, there may be limited rejection (if any) of adjacent channel interference signals when the radio is used to carry signals with narrow channel spacing. To overcome this, several independently controlled attenuators are deployed in several stages of the receiver path, and the IF AGC amplifier is operated below (e.g., 20 dB or more) its P1 DB compression point when the adjacent interference signal is not present. This ensures that the required linearity of the desired signal will be preserved even in the presence of the strong adjacent channel interference signals.

In order to maintain the second IF signal level constant (e.g., at 70 MHz), the AGC control loop derives the AGC amplifier gain control voltage from a sample of the second IF signal. This IF signal may be extracted using the single, relatively narrow bandwidth (e.g., 3.5 MHz) second IF bandpass filter 262 for all the system configurations. Thus, only one calibration is required to provide accurate control voltage for the AGC loop for all the system configurations. This is accomplished by introducing different correction factors for different capacities, with different channel spacing using modulations from, e.g., QPSK to 256QAM. The AGC control voltage is preferably set to be proportional to the real desired signal strength, even in the presence of strong adjacent interference signal in the receiver path, since bandpass filter 262 eliminates all the adjacent channel interference signals.

The RSL detection circuit derives the RSL indication voltage by sampling the first IF signal (e.g., in the 1 GHz to 2 GHz range). This sample of the first IF signal is further downconverted via mixer 246 to a lower IF frequency (e.g., 70 MHz) for ease of implementing the narrow bandpass filter 247. The output of the narrow band (e.g., 3.5 MHz) filter 247 is further processed in RSL detector 248, which may be any of a variety of commercially available RSL chips. Using a single calibration in conjunction with applying correction factor for each of the differing desired signal bandwidth and modulation levels, an accurate RSL level may be derived even in the presence of strong adjacent channel interference signals.

Together, this software controlled AGC closed loop and RSL detection processes make possible a wideband, capacity independent, and modulation independent microwave RFU. By making use of a common path, costs are advantageously held down. However, this RFU 120 can still process the RF/IF signals, for capacities ranging from 1.5 Mb/s (T1) to 180 Mb/s (4 DS3) and beyond, using a variety of authorized channel spacings (e.g., from 2.5 MHz up to 56 MHz). Depending on the capacity and the authorized channel spacing, different modulations are used, ranging from QPSK up to 256QAM (and beyond). The configuration of the system also allows for full software programmability.

Figure 8:
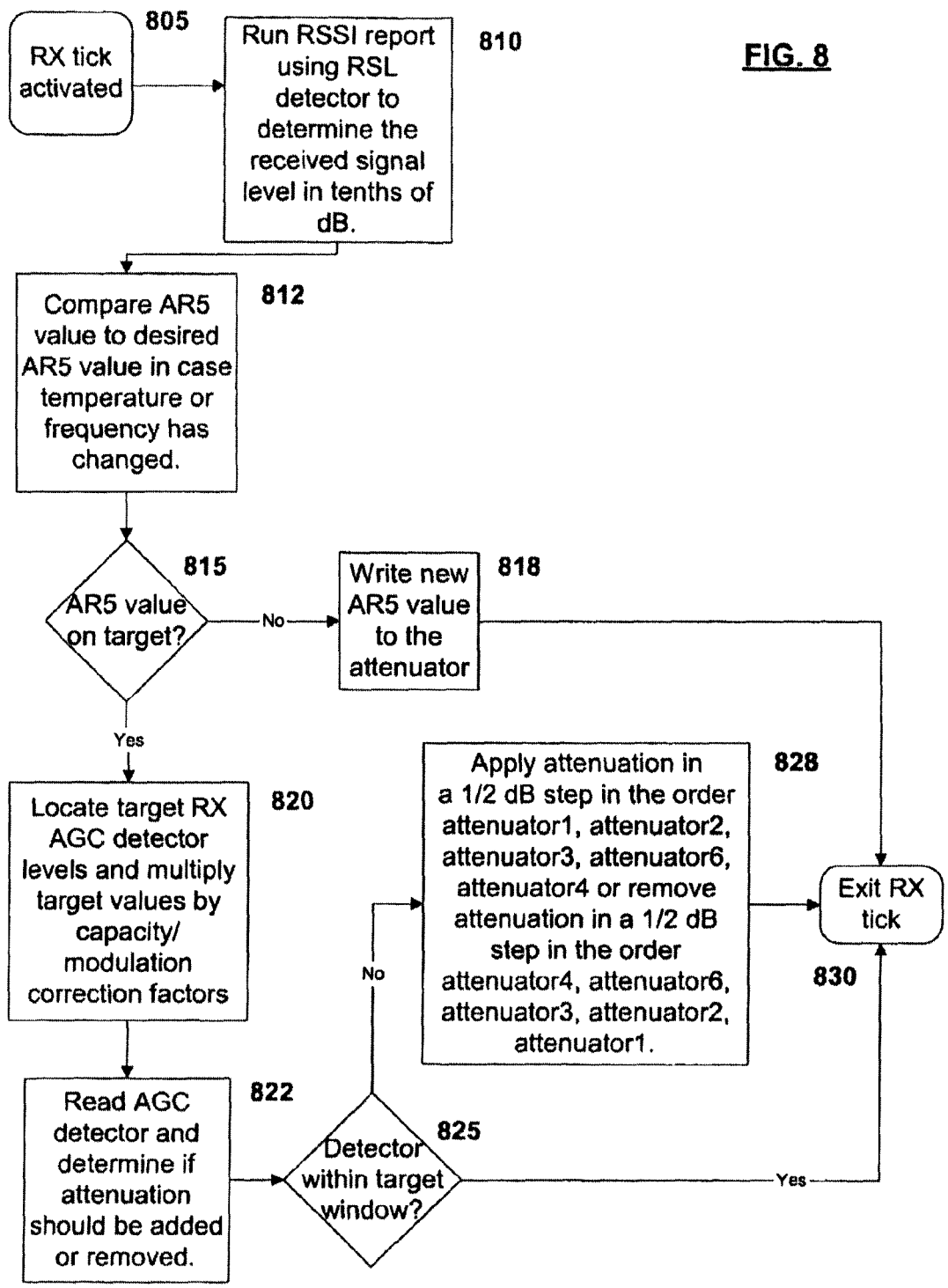
FIG. 8 illustrates a flow chart of an algorithm for controlling receive path settings according to an embodiment of the invention.

The receive control algorithm is further illustrated by the exemplary flow chart of FIG. 8. On first activating a receive tick, the received signal power level is calculated using RSL detector 238. This value for attenuator AR5 435 is compared to a predetermined/desired value (e.g., in case of variations due to temperature or frequency), and if the value is different the predetermined value is applied as the new AR5 435 value (steps 705-818). If the AR5 value is on target (e.g., within a target window of 1.5 dB), the AGC detector 230 value is determined and compared against corrected target AGC 230 values, the corrected values having been determined by multiplying the AGC 230 detected levels by predetermined capacity/modulation correction factors (steps 820-825). If the AGC detector value is not within the target window, attenuation is incrementally applied by adding attenuation (e.g., in ½ dB steps), preferably in the order of AR1, AR2, AR3, AR6 and AR4, or removing stepped values, preferably in the reverse of the order in which attenuation is added, until the detected value is within the target window (steps 825-830).

5. A Calibration Process

Unlike prior calibration processes, the approach described here avoids the necessity for calibration of the radio unit as a whole. It also advantageously avoids an over-temperature calibration for each unit (i.e., calibrating the whole RF unit at each temperature increment within the calibration range). The need for whole-radio calibration is avoided since calibration is now done on a module basis. Over-temperature calibration is avoided by appropriate pilot and production sample calibration.

a. Rx MMIC Calibration

Beginning then with Rx MMIC module 400, this is the simplest module to calibrate since the only elements needing calibration are the attenuators AR5 and AR6 435, 436. This process includes:

At a first frequency and temperature, starting with 0 dB attenuation at AR6:

1) Set the RX input to a selected level (e.g., −30 dBm) with minimum Rx RF attenuation (0 dB or DAC of 0);
2) adjust the AR5 to the predetermined total module gain value (e.g., 8 dB), and store AR5 control DAC value into memory (EEPROM 450);
3) increment AR6 (e.g., 1 dB) and store the AR6 DAC value;
4) repeat step 3 until calibrated across the dynamic range (e.g., 10 dB) of AR6;
5) increment the frequency, and repeat steps 1-4 for each new frequency; and
6) increment the temperature, and repeat steps 1-5 for each new temperature.

In a preferred approach, step 6) is only done for a small number of initial (representative) units and periodic samples from a production run. The test temperatures do not need to be at regular intervals, as linear interpolation can provide sufficiently accurate values so that only a limited number of temperatures need to be tested (e.g., at −25 C, 5 C, 35 C and 70 C). When taking the values from the initial production units, small runs, such as 10 representative (beta, pilot or even production) units will provide values that when, averaged for all units, can provide accurate table values when interpolated. It is also preferable to take periodic samples of a production run and perform a full calibration, as this will adjust the "master" values in response to changed characteristics in the components (e.g., different batches, manufacturers, or the like).

When in production, a simplified process can be used to test each module. First, each module is only tested at one temperature (e.g., 25 C or room temperature is the most convenient, although similar economies are realized if multiple temperatures are tested, but a lesser number than for the representative units). The values for other temperatures are interpolated based on a comparison of the measured values versus the current "master" calibration values. A pure tone (CW or continuous wave) may also be advantageously used, with moderate frequency increments (e.g., 100 MHz steps). In this manner, the time and expense of typical unit calibration is dramatically reduced, but without loss in the accuracy of the calibrated output of each module.

b. Tx MMIC Calibration

The Tx MMIC module 300 calibration is similarly straightforward, with calibration being performed on both detectors 307, 320 and attenuator AT5 315. An illustrative calibration process for attenuator 315 includes:

1) adjust the Tx IF input power level to get the target output power level (e.g., QPSK-10 dB);
2) adjust the AT5 control DAC value to calibrate the attenuator, and store the AT5 control DAC value into memory (EEPROM 350, in AT5 calibration table);
3) increment the Tx IF input power (e.g., 1 dB) across the desired range (e.g., 18 dB), repeating steps 1-2;
4) increment the temperature, and repeat steps 1-3 for each new temperature.

An illustrative calibration process for Tx IF detector 307 includes:

1) adjust AT5 to an initial target value (e.g., 13 dB, based on the AT5 calibration table DAC value for the module's actual temperature and frequency);
2) Adjust the Tx IF input power level to obtain a desired Pout (module output power level, e.g., of QPSK-9 dB), and store the detector 307 ADC value into memory (EEPROM 350, in IF detector 307 calibration table);
3) increment the Tx IF input power (e.g., 1 dB) across the desired range (e.g., 44 dB, or Pout of QPSK-9 dB to QPSK-53 dB), repeating steps 1-2; 4) increment the temperature, and repeat steps 1-3 for each new temperature.

The Tx RF detector 320 may then be calibrated as follows:

1) set AT5 to an initial target value (e.g., 4 dB), and adjust the Tx IF input power level to obtain a desired modulation Pout (e.g., QPSK power level);
2) set the RF detector 320 gain control to low gain,
3) store the RF detector 320 ADC value in memory (EEPROM 350, in RF detector 320 low gain calibration table);
4) increment the Tx IF input power (e.g., 1 dB) across the desired range (e.g., 10 dB, or Pout of QPSK-0 dB to QPSK-10 dB), repeating step 3; then 5) adjust the adjust the Tx IF input power level to obtain a second desired modulation Pout (e.g., 64QAM power level), and set the RF detector 320 gain control to high gain,
6) store the RF detector 320 ADC value in memory (EEPROM 350, in RF detector 320 high gain calibration table);
7) increment the Tx IF input power (e.g., 1 dB) across the desired range (e.g., 10 dB), repeating step 6;
8) increment the temperature, and repeat steps 2-7 for each new temperature.

In addition to these calibration measurements, one may also want to determine and store appropriate tables for a Tx modulation index, detector 307 value for Tx IF overdriven alarm, and a Pout offset (e.g., −1.5 dB for calibrated versus specified RFU nominal output power).

c. IF/RPC (Transmit) Calibration

For each calibration, the following initialization may be used:

Step 1: apply input signal (e.g., −12 dBm at 310 MHz, at cable interface port J3); set AT1 and AT4 at minimum attenuation (0); set Cable Compensation Switch 219 to bypass amplifier; set AT2 and AT3 at minimum attenuation (DAC 0); unmute Tx; inject LO (e.g., +3 dBm);

Step 2: store Pout level=PoutRef (dBm)

At the time PoutRef is determined, several other values may be determined. Thus, e.g., the Tx_Cable detector DAC value is now stored, and the range verified by comparing the variation of this value and confirming it is proportional to the input level when stepped across a selected range. Tx mute may also be verified (e.g., confirming PoutRef<−85 dBc after mute).

The attenuator AT3 213 may be calibrated as follows:

1) initialize the module 200;
2) adjust AT3 until Pout decreases (e.g., at least 0.1 dB and less then +0.2 dB), and store the AT3min DAC value (EEPROM 250, in AT3 calibration table);
3) adjust AT3 until Pout decreases (e.g., to 1+/−0.1 dB), and store the AT3 DAC value;
4) increment the Tx IF input power (e.g., 1 dB) across the desired range (e.g., 15 dB), repeating steps 2-3; then
5) verify delta Pout (e.g., within 15+/−0.2 dB from minimum to maximum attenuation);

6) store values (e.g., AT3 control DAC value into memory 250 (should be proportional to attenuation); minimum and maximum AT3 DAC value; minimum 1 dB delta AT3 DAC value);
7) increment temperature, repeat steps 1-6 for each temperature.

The attenuator AT2 212 is similarly calibrated as follows:
1) initialize the module 200;
2) adjust AT2 until Pout decreases (e.g., at least 0.1 dB and less then +0.2 dB), and store the AT2min DAC value (EEPROM 250, in AT2 calibration table);
3) adjust AT2 until Pout decreases (e.g., to 1+/−0.1 dB), and store the AT2 DAC value;
4) increment the Tx IF input power (e.g., in 1=/−0.15 dB steps) across the desired range, repeating steps 2-3; then
5) verify delta Pout (e.g., within 29+/−0.25 dB from minimum to maximum attenuation);
6) store values (e.g., AT2 control DAC value into memory 250 (should be proportional to attenuation); minimum and maximum AT2 DAC value; minimum 1 dB delta AT2 DAC value);
7) increment temperature, repeat steps 1-6 for each temperature.

d. IF/RPC (Receive) Calibration

There are three main calibration routines in the IF/RPC receive path calibration process. First, the Rx IF AGC detector 230 may be calibrated as follows:
1) set AR2, AR3 and AR4 at minimum attenuations, and set the Rx IF input (e.g., at −80 dBm);
2) adjust AR1 until Rx IF output reaches a preselected value (e.g., −14.3+/−0.1 dBm), and store the AGC ADC value (in EEPROM 250, in Rx AGC calibration table);
3) adjust AR1 until the Rx IF output reaches a preselected value (e.g., −15.8+/−0.1 dBm), and store the AGC ADC value.

The Rx RSL detector 248 may be calibrated as follows:
1) set AR1 through AR4 at maximum attenuations, set the Rx RF input (e.g., to −20 dBm), and store the Rx RSSI (received signal strength indicator) ADC value (Rx_RSSI) and voltage (Rx_RSSI_Volt);
2) adjust Rx RF input to decrease by a preselected value (e.g., −1 dB), and store the Rx RSSI ADC value
3) repeat step 2 until Rx RF input reaches a preselected value (e.g., −87 dBm).

Finally, the Rx attenuator dynamic range calibration may be performed as follows:
1) set the Rx RF input (e.g., to −65 dBm), and store the Rx RSSI ADC value (Rx_RSSI) and voltage (Rx_RSSI_Volt);
2) set AR1 to a preselected value (e.g., 150), and AR2-AR4 at minimum attenuations (0 dB), and store Rx IF output power level;
3) for a first attenuator, increment IF output (e.g., in 1+/−0.15 dB steps) until a maximum attenuation is reached (the variation of DAC count may be 2 minimum for 1 dB of attenuation).
4) compare the first attenuator's range with its operational range;
5) store AR1-AR4 DAC values, maximum and minimum values, and minimum DAC delta (e.g., for 1 dB change), into EEPROM 250.

e. RFU (Multi-Module) Calibration

While there is no whole unit calibration performed during production, there will be several calibrations or calculations performed when the modules are put together as an RFU 120 and powered on site. On the transmit path, examples include: IF AGC calibration for cable length compensation; IF cable alarm; nominal output power and output dynamic control; PA detector alarms; power mute; and Tx IF overdriven alarm.

While one of ordinary skill in the art will understand how to implement these, and depending on their design, other calibration processes, a few examples are worth mentioning. First, AT4 is used in this embodiment for the modulation index, and calculated accordingly. AT5 contributes a first range (e.g., 10 dB) for temperature compensation, and following (e.g., up to 8 dB) for RF close loop control. Because of the dynamic range of RF detector, the RF close loop range is modulation dependent.

In order to maximize the usage of AT2 and AT3, there is no clear separation between the AT2 and AT3 operation range when closed-loop with RF or IF detector. It is closed-loop with AT3 first, and then AT2 when AT3 reaches a maximum (e.g., 15 dB) attenuation. To avoid excess high output power during setup, the output power level should be adjusted from its low level to high level. AT2 and AT3 provide a combined maximum attenuation range (e.g., 37 dB), but in addition, they may be designed to take care of some temperature variation and unit-to-unit gain variation.

With respect to the correction factors, a Tx output power correction factor should be applied to correct the output power at the antenna port. One such correction factor would be $$Prfu = Ptx\text{module} + \text{Initial Diplexer loss} - L\_Diplexer - L_{RL_{SW-RF}} \text{Attenuation}, \qquad \text{Eq. 1}$$

where the customer diplexer insertion loss is L_Diplexer and optional RF loop-back switch insertion loss is L_RL_SW, and an initial diplexer loss is preset (e.g., to 1.5). If the IF AGC detectors is not a true power detector, then a correction factor may also be needed for differing modulations to maintain constant leveling. Finally, if the IF/RF detector do not use a true power detector, then a correction factor will also be needed for differing modulations for Pout display.

On the Rx path, there are two items that may need calibration or calculation. The first of these, for RSL display, is a correction factor depending on modulation and capacity. An example of such a calculation is:

$$RFU_{RSL} = IF/RPC_{RSL} - 8\text{ dB} + L\_Diplexer + L_{RL_{SW}} + AR6, \qquad \text{Eq.2}$$

where the diplexer insertion loss is L_Diplexer, the optional RF loopback switch insertion loss is L_RL_SW, and the RSL range is between −35 dBm to −20 dBm. Second, the AGC range may need adjustment. In this case, an algorithm may be implemented to determine if the Rx AGC detector voltage is within a predetermined high-low range, and if so the AR1-AR6 values are accepted. If not, then a corresponding attenuator value may be incrementally increased or decreased until the detected AGC value is within the high-low range.

Figure 9:
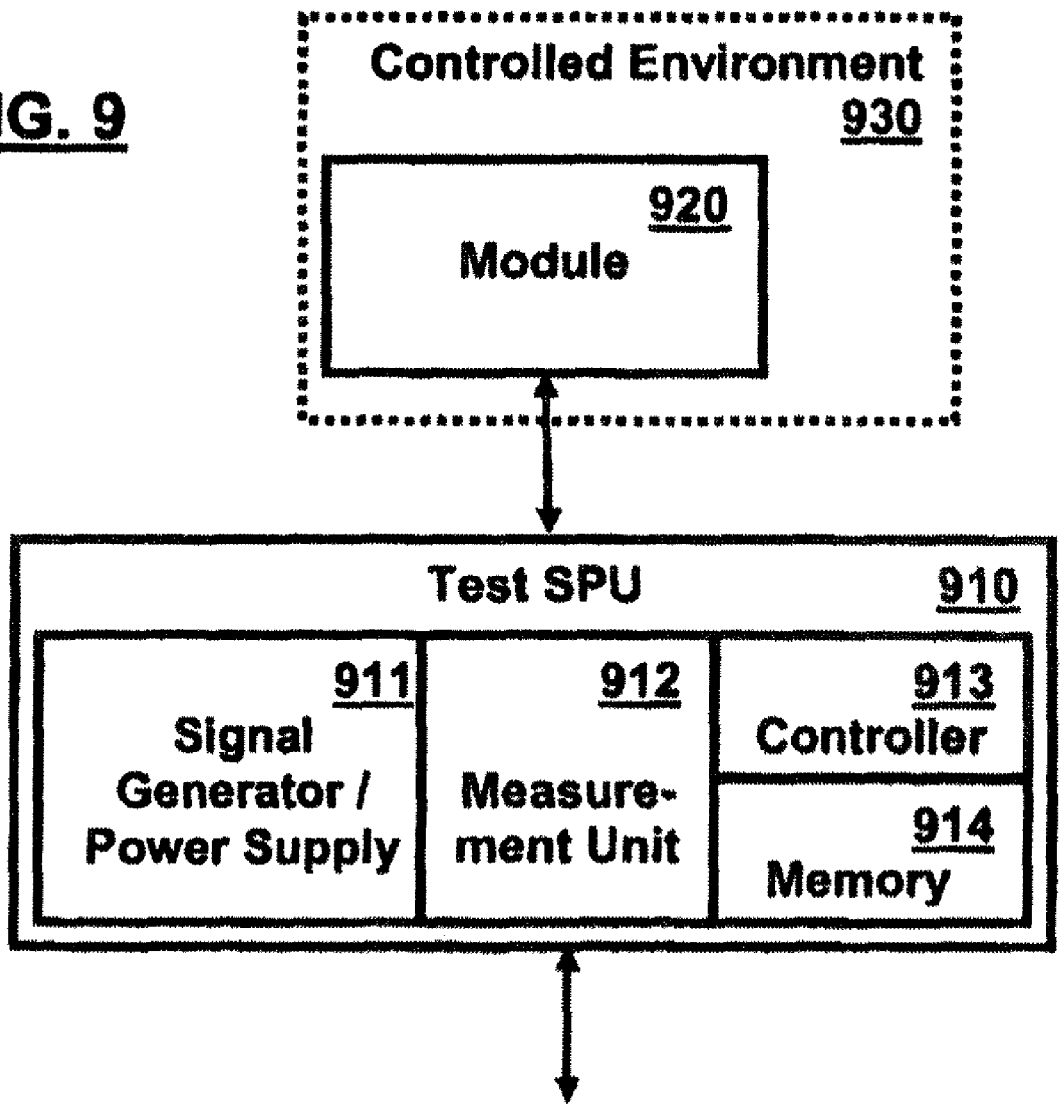
FIG. 9 illustrates a block diagram of a calibration system according to an embodiment of the invention.

Finally, turning to FIG. 9 a simple test set-up is illustrated. In this illustrated set-up, a test unit 910 includes an appropriate power supply and signal generator 911 (which, as noted above, can advantageously be a pure tone generator capable of rapidly incrementing (e.g., in 100 MHz steps) through a desired test spectrum). This unit is connected to the module 920 being tested by convenient means, which could include manual means or, depending on the connectors used with the module, any appropriate automated or quick connect unit (not shown). A measurement unit 912 is appropriately configured to capture the power and other measured values during each calibration test, and provide these to controller/processor 913 for processing or storage. Controller 913 is configured to run the appropriate calibration routines, based on the signals input, set attenuator and detector values, temperature and measured values, and stored calibration values in memory 914, to determine the calibration values for the module being tested. Controller 913 also causes the determined calibration values to be stored in the module's EEPROM or, when gathering representative (e.g., pilot) unit information, memory 914. A controlled environment 930 is also provided for the temperature range tests of pilot modules, but would not be needed for production modules being tested at room temperature, as described above. While FIG. 9 illustrates a simple test set-up, those of ordinary skill in the art will readily appreciate that a wide variety of test set-ups can be adapted for use in accordance with the invention, depending on factors such as the particular type and configuration of the module to be tested, the degree of automation desired, etc.

Thus, the present invention provides an improved microwave RF unit, and process for calibrating and operating such. The modular approach allows for simplified test/calibration during production, and ease of field replacement of select modules without replacing the entire RFU. Its unique common path design also enables use across a wide-range of capacities, modulations, and frequencies, providing greater flexibility in a more cost efficient form than has previously been possible.

Of course, those skilled in the art will appreciate how a variety of alternatives are possible for the individual elements, and their arrangement, described above, while still falling within the scope of the invention. Thus, while it is important to note that the present invention has been described in the context of a particular double conversion microwave RFU, those of ordinary skill in the art will appreciate that the components and processes of the present invention are capable of being further distributed or aggregated with others, such as in complete wireless base stations, using any convenient modulation (e.g., FSK, ASK, OFDM), adding other functionality such as distortion control, and components illustrated as if discrete in nature may, in the forseeable future, be replaced by equivalently functioning hardware and/or software chips. The principle of room temperature calibration for production units, while sampling across a wider temperature (and if desired frequency, power) range is also applicable to a highly integrated single module system. Moreover, while certain transmission-type media was particularly described, others such as digital and analog communications links, wired or wireless communications links using similar microwave transmission forms may apply. Moreover, while the depicted embodiment is described in connection with a microwave transceiver, the term microwave should be understood to encompass the higher frequency millimeter wave transmissions, for which the advantages of our invention should similarly apply.

In conclusion, the above description has been presented for purposes of illustration and description of an embodiment of the invention, but is not intended to be exhaustive or limited to the form disclosed. This embodiment was chosen and described in order to explain the principles of the invention, show its practical application, and to enable those of ordinary skill in the art to understand how to make and use the invention. Many modifications and variations will be apparent to those of ordinary skill in the art. Thus, it should be understood that the invention is not limited to the embodiments described above, but should be interpreted within the full spirit and scope of the appended claims.

We claim:

1. A method of operating a modular wide-range microwave transceiver, having precalibrated modules, comprising the steps of:

coupling the precalibrated modules to form a radio unit, each module having a module memory storing predetermined calibration values;

coupling the radio unit to a signal processing unit;

determining a first attenuation value by adjusting a first transmit attenuator to achieve a predetermined target output of a AGC detector, and storing the first attenuation value in a first module memory; and when an RF loopback switch is coupled as part of the radio unit, determining a received signal level (RSL) correction factor and transmit output power correction factor based on a loop-back switch insertion loss.

2. The method of claim 1, further comprising applying the transmit output power correction factor to correct output power at an antenna port.

3. The method of claim 1, wherein determining the first attenuation value comprises incrementing or decrementing the first attenuation value.

4. The method of claim 1, further comprising coupling the radio unit to a diplexer.

5. The method of claim 4, wherein the transmit output power correction factor is also based on a diplexer insertion loss.

6. The method of claim 4, wherein the RSL correction factor is also based on a diplexer insertion loss.

7. A transceiver comprising:

a signal processing unit (SPU); and a radio frequency (RF) unit operatively coupled to the SPU, the RF unit including a plurality of precalibrated modules, each precalibrated module of the plurality of precalibrated modules comprising a module memory, the plurality of precalibrated modules comprising:

a first precalibrated module configured to determine a modified attenuation value by adjusting a predetermined attenuation value until a target output of an AGC detector is within a predetermined target range and to store the modified attenuation value within the module memory, a second precalibrated module configured to determine a loop-back switch insertion loss, and a third precalibrated module configured to determine a received signal level (RSL) correction factor and an transmit output power correction factor based on the loop-back switch insertion loss.

8. The system of claim 7, wherein the first precalibrated module is further configured to apply the output power correction factor to correct output power at an antenna port.

9. The system of claim 7, wherein adjusting the predetermined attenuation value comprises incrementing or decrementing the predetermined attenuation value.

10. The system of claim 7, wherein the transceiver further comprises a diplexer operationally coupled to the RF unit.

11. The system of claim 10, wherein the transmit output power correction factor is also based on a diplexer insertion loss.

12. The system of claim 10, wherein the RSL correction factor is also based on a diplexer insertion loss.

13. The system of claim 7, wherein the second precalibration module is the third precalibration module.

14. A method of calibrating a transceiver, the method comprising:

determining if a voltage of an AGC detector is within a predetermined range;

modifying an attenuation factor until the voltage of the AGC detector is within the predetermined range;

storing the attenuation factor within a transceiver memory;

determining a transmit output power correction factor based, at least in part, on a loop-back switch insertion loss; and applying the transmit output power correction factor to correct output power at an antenna port.

15. The method of claim 14, further comprising:

coupling a plurality of precalibrated modules to form the RF unit, each precalibrated module of the plurality of precalibrated modules having a module memory, each module memory storing at least one predetermined calibration value; and coupling the RF unit to a signal processing unit to form at least part of the transceiver.

16. The method of claim 15, wherein the transceiver memory is the module memory within at least one precalibrated module of the plurality of precalibrated modules.

17. The method of claim 14, further comprising coupling the RF unit to an RF loopback switch.

18. The method of claim 14, wherein modifying the attenuation factor comprises incrementing or decrementing the attenuation factor.

19. The method of claim 14, further comprising coupling the RF unit to a diplexer.

20. The method of claim 14, wherein the transmit output power correction factor is also based, at least in part, on a diplexer insertion loss.

21. The method of claim 14, further comprising determining an RSL display correction factor based, at least in part, on the loop-back switch insertion loss.

22. The method of claim 21, wherein the RSL display correction factor is also based, at least in part, on the diplexer insertion loss.

* * * * *